US008506230B2

(12) United States Patent
Ollila et al.

(10) Patent No.: US 8,506,230 B2
(45) Date of Patent: Aug. 13, 2013

(54) DISTRIBUTOR DEVICE

(75) Inventors: Janne Ollila, Espoo (FI); Tom Rönnberg, Espoo (FI); Ari Ceder, Masala (FI)

(73) Assignee: Outotec Oyj, Espoo (FI)

( * ) Notice: Subject to any disclaimer, the term of this patent is extended or adjusted under 35 U.S.C. 154(b) by 352 days.

(21) Appl. No.: 12/743,534

(22) PCT Filed: Nov. 14, 2008

(86) PCT No.: PCT/FI2008/050660
§ 371 (c)(1),
(2), (4) Date: May 18, 2010

(87) PCT Pub. No.: WO2009/066005
PCT Pub. Date: May 28, 2009

(65) Prior Publication Data
US 2010/0290866 A1    Nov. 18, 2010

(30) Foreign Application Priority Data
Nov. 21, 2007    (FI) .................................... 20075825

(51) Int. Cl.
*B65G 25/00*    (2006.01)
(52) U.S. Cl.
USPC ............................. 414/208; 414/301; 373/81
(58) Field of Classification Search
USPC .............. 414/133, 142.2, 147, 160, 170, 172, 414/174, 189, 194, 195, 199, 206, 207, 588, 414/150, 152, 153, 179, 208, 287, 288, 293, 414/299, 300, 301, 586; 193/3, 16; 373/79, 373/80, 81, 115, 142
See application file for complete search history.

(56) References Cited

U.S. PATENT DOCUMENTS

| 758,475 | A | * | 4/1904 | Reuleaux | 414/187 |
| 1,539,559 | A | | 5/1925 | Hamachek | |
| 1,891,821 | A | * | 12/1932 | Juengling | 414/203 |
| 2,088,117 | A | * | 7/1937 | Rehnberg | 221/178 |
| 2,753,056 | A | * | 7/1956 | Ryan et al. | 414/206 |
| 2,964,153 | A | * | 12/1960 | Nowak, Jr. | 193/32 |
| 2,965,250 | A | * | 12/1960 | Johansson | 414/201 |
| 3,796,419 | A | * | 3/1974 | Werner et al. | 414/170 |

(Continued)

FOREIGN PATENT DOCUMENTS

| CA | 1 193 834 | 9/1985 |
| DE | 199 27 447 A1 | 1/2000 |

(Continued)

*Primary Examiner* — Saul Rodriguez
*Assistant Examiner* — Glenn Myers
(74) *Attorney, Agent, or Firm* — Merchant & Gould P.C.

(57) ABSTRACT

A distributor device including a distribution chute that extends inside the tank at an inclined angle for distributing material in the interior of the tank. A rotation frame is rotatable around a vertical central rotation axis (L) and includes a vertical inlet channel extending to the interior of the tank. A circular support frame is horizontally attached to the rotation frame, concentrically in relation to the vertical central rotation axis. A number of support rollers are connected to the tank and the axes of the support rollers are positioned radially with respect to the central rotation axis (L). At least one of the support rollers is as a support roller driving the rotation frame, which support roller the actuator is arranged to rotate. The distributor device includes a counterweight attached to the rotation frame, on the opposite side of the central rotation axis (L) in relation to the distribution chute.

9 Claims, 2 Drawing Sheets

(56) References Cited

U.S. PATENT DOCUMENTS

Figure 1:
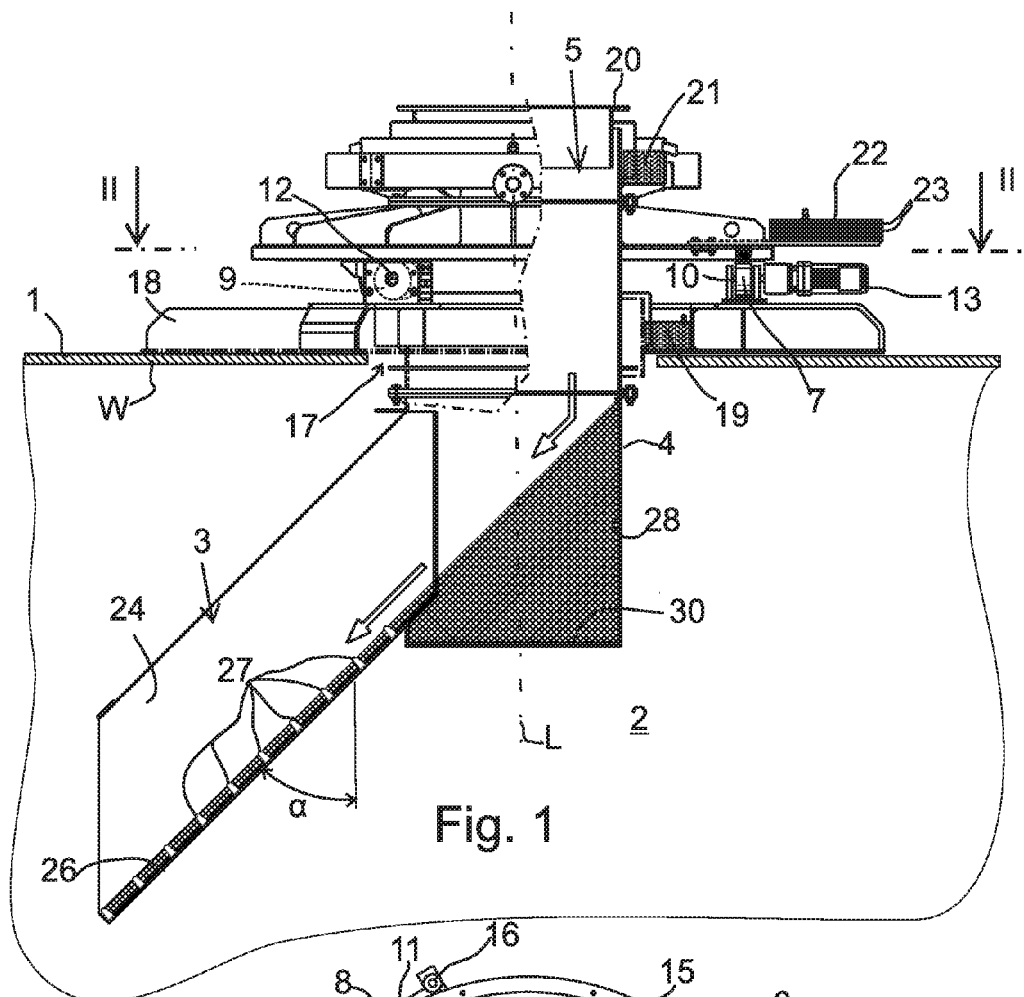

| | | |
|---|---|---|
| 3,899,088 A | 8/1975 | Furuya et al. |
| 4,029,220 A | 6/1977 | Greaves |
| 4,705,474 A | 11/1987 | Honkaniemi et al. |
| 4,708,640 A | 11/1987 | Honkaniemi et al. |
| 4,921,086 A * | 5/1990 | Klutz et al. ............ 193/3 |
| 5,022,806 A * | 6/1991 | Lonardi et al. ......... 414/208 |
| 5,450,936 A | 9/1995 | Andonov et al. |
| 5,755,837 A * | 5/1998 | Beierle et al. ........... 48/76 |
| 5,799,777 A * | 9/1998 | Mailliet et al. .......... 198/642 |
| 6,099,301 A | 8/2000 | Honkaniemi et al. |
| 6,390,268 B1 * | 5/2002 | Lonardi ............... 193/16 |
| 6,916,146 B1 * | 7/2005 | Lonardi et al. ......... 414/293 |
| 2005/0063804 A1 * | 3/2005 | Gorza et al. ........... 414/301 |
| 2006/0237280 A1 * | 10/2006 | Ellis et al. ............ 193/2 R |

FOREIGN PATENT DOCUMENTS

| | | |
|---|---|---|
| EP | 0 080 333 A2 | 6/1983 |
| FI | 84277 | 12/1985 |
| FI | 71088 | 8/1986 |
| FI | 105236 | 6/2000 |
| JP | 10-236660 | 9/1998 |

\* cited by examiner

DISTRIBUTOR DEVICE

FIELD OF THE INVENTION

The invention relates to a distributor device defined in the preamble of claim 1.

BACKGROUND OF THE INVENTION

In the prior art there is known the pretreatment of mineral alloy material, prior to feeding the material into an electric furnace, through a preheating arrangement, so that the feed mixture is heated in a separate preheating silo, where granular or lump-like (for example pelletized) feed mixture is heated and dried. Preheating is necessary in order to reduce the amount of energy needed for smelting the material in the electric furnace proper, and in order to volatilize certain impurities before feeding the material into an electric furnace. Preheated feed material also stabilizes the operation of the furnace. It is a well-known practice to use one or several preheating furnaces per each electric furnace. The material to be heated is fed in batches through a feed silo, by means of a distributor device, to the preheating silo, where the material is heated by a hot gas flow. Typically the hot gas mixture is fed into the preheating furnace through the bottom part thereof, so that it is distributed evenly inside the material bed. The preheating furnace is connected to the smelting furnace in a known fashion by separate feed pipe arrangements that extend through the ceiling of the smelting furnace to the interior of the electric smelting furnace, thus feeding the preheated material for smelting. Various preheating furnace arrangements are described for example in the publications FI 842577 A, FI 105236 B and FI 71088 B. In the prior art there also is known, from the publication U.S. Pat. No. 4,029,220, a rotary distributor by which material can be fed in a tank through the top part thereof, and said material can be distributed to suitable locations inside the tank. The distributor means include a distribution chute extending inside the tank at an inclined angle α with respect to the vertical direction for distributing the material to the interior of the tank. Further, the distributor means include a rotation frame that can be rotated around a central vertical rotation axis. The rotation frame essentially includes a vertical inlet channel that extends to the interior of the tank. The distribution chute is attached to the lower part of the rotation frame. An inlet channel opens upwardly for receiving any gravitationally moving loose material, and downwardly for discharging said loose material to the distribution chute, and further through the distribution chute to the tank. Moreover, the distributor device includes a circular support frame that is attached horizontally to the rotation frame and concentrically with respect to the central vertical rotation axis. A number of support rollers is connected to the tank, so that the axes of the support rollers are positioned radially in relation to the central rotation axis. The support rollers are arranged to be in contact with the support frame for supporting the rotation frame on the support rollers and for bearing mounting the rotation frame to be rotary in relation to the tank. Power means are arranged to rotate the rotation frame. In the distributor known from said US publication, the rotation frame is provided with a gear ring, which the power means rotate by intermediation of a gear wheel.

A drawback with the known distributor means is that the gear ring and the gear wheels are expensive components that are easily susceptible to damage, and they are cumbersome to maintain and replace.

OBJECT OF THE INVENTION

The object of the invention is to eliminate the above mentioned drawbacks.

A particular object of the invention is to introduce an economical, maintenance-friendly distributor device with a long working life.

Moreover, an object of the invention is to introduce a distributor device without any gear ring and gear wheels.

SUMMARY OF THE INVENTION

The distributor device according to the invention is characterized by what is set forth in claim 1.

According to the invention, at least one support roller is arranged as a support roller driving the rotation frame that an actuator is arranged to rotate. The distributor device includes a counterweight that is attached to the rotation frame, on the opposite side of the central rotation axis in relation to the distribution chute, said counterweight being arranged to balance the rotation frame.

It is an advantage of the invention that any-expensive gear rings or gear wheels are not needed in the rotation mechanism of the distributor device, which means that the distributor device is made more economic and maintenance-friendly than in the prior art. Owing to the counterweight, there is obtained a symmetrical strain for the support roller bearings, the support roller bearings being subject only to vertical forces. Thus, the wear of the bearings and the need for maintenance is small. In addition, there is obtained a longer working life for the distributor device than in the prior art.

In an embodiment of the distributor device, the counterweight is attached to the rotation frame outside the tank.

In an embodiment of the distributor device, the counterweight is a weight set formed of a number of mutually superimposed weight plates.

In an embodiment of the distributor device, the support frame has an essentially smooth, horizontal underneath surface, with which the support rollers are arranged in a friction contact.

In an embodiment of the distributor device, the support frame has an essentially smooth, vertical outer circumferential surface. The distributor device includes a number of control rollers that are bearing mounted to rotate around the vertical axes and arranged in contact with the outer circumferential surface for supporting the rotation frame in the sideways direction.

In an embodiment of the distributor device, the rotation frame extends essentially vertically through an aperture provided in the wall bordering the interior of the tank in the upwardly direction. In the wall, in the vicinity of the aperture, outside the tank there is attached an exterior frame to which the support rollers and control rollers are connected, so that the support rollers, the control rollers, the support frame and the actuator are located outside the tank.

In an embodiment of the distributor device, the sealing between the tank wall and the rotation frame is arranged by means of a first water seal ring.

In an embodiment of the distributor device, the sealing between the inlet channel and the immobile feed collar, through which the loose material enters the inlet channel, is arranged by a second water seal ring placed in the upper part of the inlet channel.

In an embodiment of the distributor device, the distribution chute includes side walls and a first bottom. In the first bottom, there are arranged ridges between the side walls, said ridges being spaced apart along the length of the chute and placed transversally with respect to the material flowing direction; these ridges are arranged to arrest in between them part of the loose material, so that the loose material creates an autogenous protective layer in between the material flow and the bottom, in order to protect the bottom against wearing.

In an embodiment of the distributor device, in the interior of the tank the inlet channel is sideways bordered by a vertical wall provided with a discharge aperture, through which the loose material is discharged to the distribution chute, and in the downwardly direction it is bordered by an essentially horizontal second bottom that is located lower than the discharge aperture, so that the loose material collected on top of said second bottom creates an autogenous protective layer for protecting the inlet channel vertical wall and the second bottom against wearing.

In an embodiment of the distributor device, the tank is a preheating silo connected to a metallurgical process, and it is arranged to preheat loose material in order to be further fed into a smelting furnace.

DRAWINGS

Figure 2:
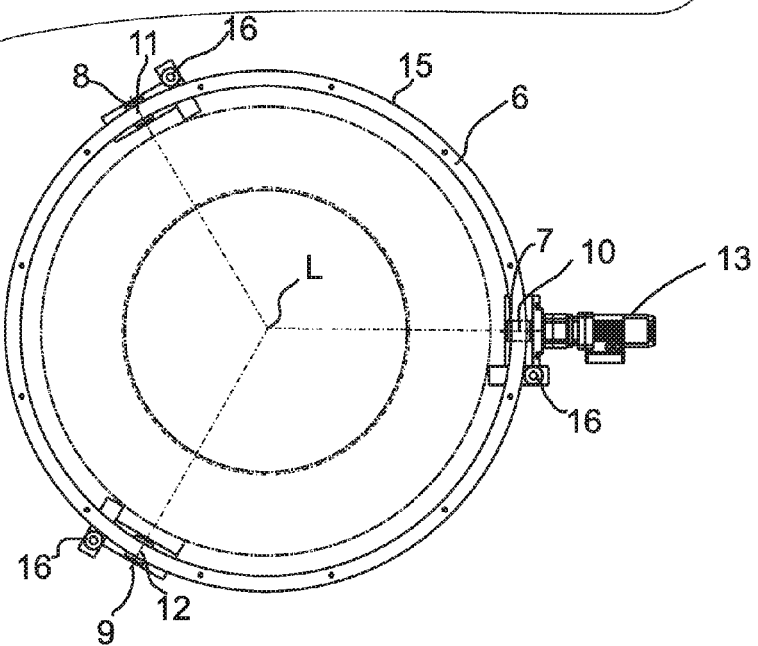
Figure 3:
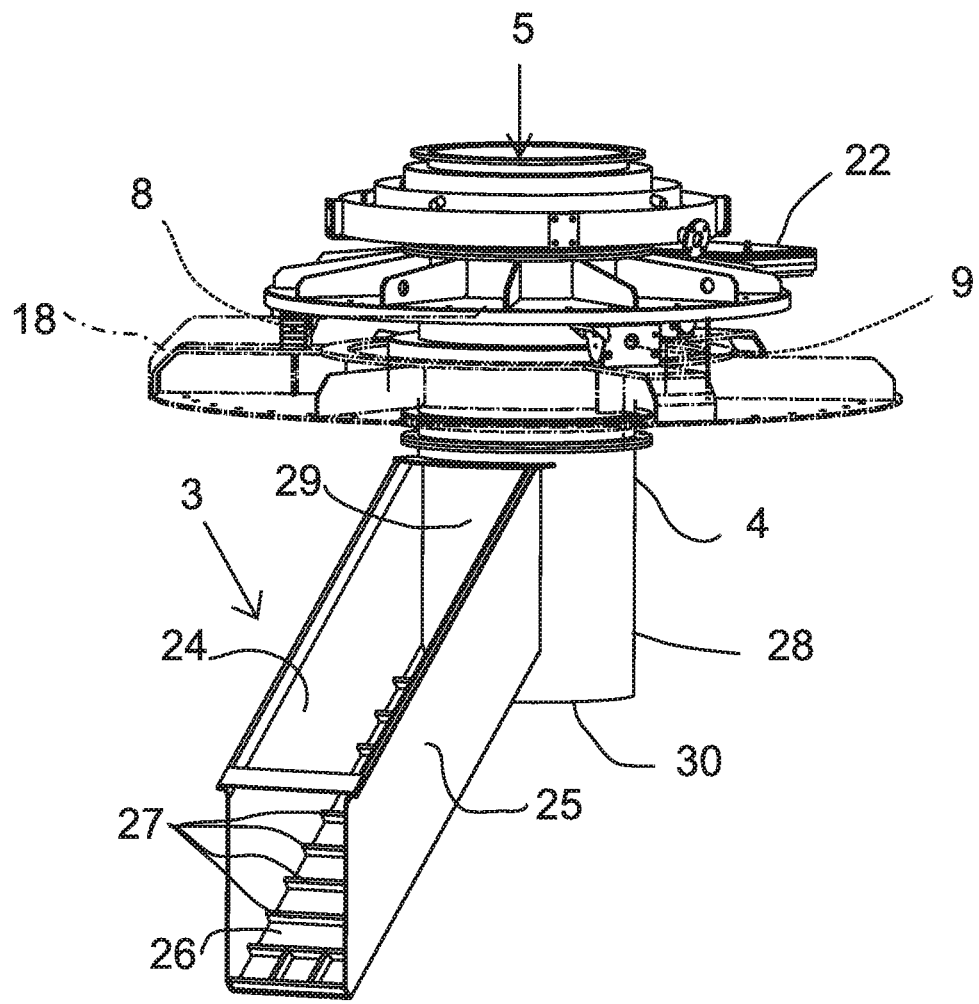

The invention is described in more detail below by means of exemplary embodiments and with reference to the appended drawings, where FIG. 1 is a side-view illustration in partial cross-section of an embodiment of the distributor device according to the invention, FIG. 2 illustrates the cross-section II-II of FIG. 1, and FIG. 3 illustrates the distributor device of FIG. 1, seen in an axonometrical view.

DETAILED DESCRIPTION OF THE INVENTION

FIGS. 1 and 2 illustrate a rotary distributor device that is arranged to feed granular, lump-like and/or powderous loose material through the upper part of the tank 1 to the interior 2 of the tank.

The distributor device includes a distribution chute 3 that extends inside the tank 1 at an inclined angle α, said angle being about 45°, with respect to the vertical direction, so that when the distribution chute 3 is rotated, it distributes the material flowing along the distribution chute 3 to the desired spots in the interior of the tank 2. The distribution chute 3 is connected to a hollow rotation frame 4 that is rotated around a vertical central rotation axis L. Inside the rotation frame 4, there is arranged a vertical inlet channel 5 that extends from outside the tank to the interior of the tank 2. The distribution chute 3 is attached to the lower part of the rotation frame 4 in the interior 2 of the tank 1. The inlet channel 5 opens upwardly, so that it can receive the gravitationally moving loose material that can flow downwardly through the discharge aperture 29 to the distribution chute 3 and further via the distribution chute 3 to the tank 1.

To the rotation frame 4, there is attached a horizontal circular support frame 6, concentrically with respect to the vertical central rotation axis L. The rotation frame 4 extends essentially vertically through the aperture 17 provided in the wall W that borders the interior 2 of the tank 1 in the upwardly direction. In the wall W, in the vicinity of the aperture outside the tank, there is attached an outer frame 18, to which three support rollers 7, 8, 9 are attached. The axes 10, 11, 12 of the support rollers 7, 8, 9 are positioned radially with respect to the central rotation axis L with a division of 120°. The support rollers 7, 8, 9 are in contact with the support frame 6 for supporting the rotation frame on the support rollers, and for bearing mounting the rotation frame to be rotary in relation to the tank. One of the support rollers 7 is arranged as a the support roller driving the rotation frame, and an actuator 13 is arranged to rotate the axis 10 of said support roller. The support rollers 7, 8, 9, the control rollers 16, the support frame 6 and the actuator 13 are located outside the tank.

FIG. 1 shows that the support frame 6 has an essentially smooth horizontal underneath surface 14, with which the support rollers 7, 8, 9 are arranged in a friction contact. In addition, the support frame 6 has an essentially smooth, vertical outer circumferential surface 15. FIG. 2 shows three control rollers 16 that are bearing mounted to rotate around the vertical axes and arranged in contact with the outer circumferential surface 15 of the support frame 6 in order to support the rotation frame 4 in the sideways direction.

The sealing provided in between the tank wall W and the rotation frame 4 is arranged by means of a first water seal ring 19. The sealing between the inlet channel 5 and immobile feed collar 20, through which the loose material enters the inlet channel, is arranged by means of a second water seal ring 21 placed in the upper part of the inlet channel 5.

FIGS. 1 and 3 show a counterweight 22, which is attached to the rotation frame 4, on the opposite side of the central rotation axis L in relation to the location of the distribution chute 3. The counterweight 22 balances the rotation frame 4. The counterweight 22 is attached to the rotation frame 4 from outside the tank. The counterweight 22 is a set of weights, formed of a number of mutually superimposed weight plates 23 that can be added in a suitable number for achieving the balance.

The distribution chute 3 has side walls 24, 25 and a first bottom 26. In the first bottom 26, there are arranged ridges 27 between the side walls 24, 25, said ridges being spaced apart along the length of the chute 3 and placed transversally with respect to the material flowing direction. The ridges 27 arrest in between them part of the loose material, so that the loose material creates an autogenous protective layer in between the material flow and the bottom, in order to protect the bottom against wearing. In the interior of the tank 2, the inlet channel 5 is in the sideways direction bordered by a vertical wall 28 provided with a discharge aperture 29, through which the loose material is discharged to the distribution chute 3, and in the downwardly direction it is bordered by an essentially horizontal second bottom 30 that is located lower than the discharge aperture 29. The loose material collected on top of the second bottom creates an autogenous protective layer for protecting the vertical wall 28 of the inlet channel as well as the second bottom 30 against wearing. The autogenous protective layer formed of the loose material is in FIG. 1 illustrated by cross-hatching.

Advantageously the tank 1, to which the distributor device feeds loose material, is a preheating silo connected to a metallurgical process and is arranged to preheat the loose material in order to be further fed into a smelting furnace. In this kind of application, the loose material contains for example sintered pellets, lump ore, lump coke, lump carbon and lump quartzite.

Feed material is fed to the preheating furnace from the storage silo by means of vibrating feeder elements. The storage silo serves as a gas seal for the furnace. The distributor device distributes the feed material to a number of compartments (silos) that are located inside the preheating furnace. From these compartments, the material flows downwards along the feed pipes, and therethrough further to the smelting furnace. The distributor device rotates and stops automatically at the furnace feed sections, one after the other. The filling level of the material in the compartments is controlled by continuous level measurements. If the material level in one of the compartments falls down to the alert level, the distributor device turns automatically to fill said compartment first. The material distribution is monitored, and control automatics take care that each feed pipe is all the time full of material, and that carbon monoxide does not have access to enter the preheating silo through the pipes from the smelting furnace. Advantageously the support frame is provided with position sensors connected thereto, by means of which sensors the position of the distributor device is at all times known by the control automatics.

The invention is not restricted to the above described embodiments only, but many modifications are possible within the scope of the inventive idea defined in the appended claims.

The invention claimed is:

1. A distributor device that is arranged to feed granular, lump-like and/or powderous loose material through the upper part of a tank to the interior of the tank, said distributor device comprising:
   a distribution chute that extends inside the tank at an inclined angle (ex) with respect to the vertical direction for distributing the material in the interior of the tank,
   a rotation frame that is rotatable around a vertical central rotation axis and includes an essentially vertical inlet channel that extends to the interior of the tank, to the lower part of which rotation frame the distribution chute is attached, said inlet channel opening upwardly for receiving any gravitationally moving loose material and downwardly for discharging said loose material to the distribution chute and through the distribution chute further to the tank,
   a circular support frame that is attached horizontally to the rotation frame and concentrically with respect to the vertical central rotation axis,
   a number of support rollers are connected to the tank, so that the axes of the support rollers are positioned radially in relation to the central rotation axis, said support rollers being arranged in contact with the support frame in order to support the rotation frame on the support rollers, and for bearing mounting the rotation frame to be rotary in relation to the tank,
   an actuator that is arranged to rotate the rotation frame, wherein at least one of the support rollers is arranged as a support roller driving the rotation frame, which support roller the actuator is arranged to rotate; that the distributor device includes a counterweight that is attached to the rotation frame on the opposite side of the central rotation axis in relation to the distribution chute, said counterweight being arranged to balance the rotation frame; that the counterweight is entirely located outside the tank; and that the counterweight is a set of weights, composed of a number of mutually superimposed weight plates.

2. A distributor device according to claim 1, wherein the support frame has an essentially smooth, horizontal underneath surface, with which the support rollers are arranged in a friction contact.

3. A distributor device according to claim 1 wherein the support frame has an essentially smooth vertical outer circumferential surface; and that the distributor device includes a number of control rollers that are bearing mounted to rotate around the vertical axes and arranged in contact with the outer circumferential surface in order to support the rotation frame in the sideways direction.

4. A distributor device according to claim 3, wherein the rotation frame extends essentially vertically through an aperture provided in the wall bordering the interior of the tank in the upwardly direction; and that to the wall, in the vicinity of the aperture, outside the tank, there is attached an outer frame, to which the support rollers and the control rollers are connected, so that the support rollers, the control rollers, the support frame and the actuator are located outside the tank.

5. A distributor device according to claim 4, wherein a seal between the tank wall and the rotation frame is arranged by means of a first water seal ring.

6. A distributor device according to claim 4 wherein a seal between the inlet channel and an immobile feed collar, through which the loose material enters the inlet channel, is arranged by means of a second water seal ring placed in the upper part of the inlet channel.

7. A distributor device according to claim 1, wherein the distribution chute has side walls and a first bottom, and that in said first bottom, there are arranged ridges between the side walls, which ridges are spaced apart along the length of the chute and placed transversally with respect to the material flowing direction, said ridges being arranged to arrest in between them part of the loose material, so that the loose material creates an autogenous protective layer in between the material flow and the bottom, in order to protect the bottom against wearing.

8. A distributor device according to claim 1, wherein in the interior of the tank, the inlet channel is in the sideways direction bordered by a vertical wall provided with a discharge aperture, through which loose material is discharged from to the distribution chute, and in the downwardly direction by an essentially horizontal second bottom, located lower than the discharge aperture, so that the loose material collected on top of the second bottom forms an autogenous protective layer for protecting the vertical wall and the second bottom of the inlet channel against wearing.

9. A distributor device according to claim 1, wherein the tank is a preheating silo connected to a metallurgical process, and it is arranged to preheat loose material to be further fed to a smelting furnace.

* * * * *